No. 832,118. PATENTED OCT. 2, 1906.
C. E. BLUE.
GLASS GATHERING AND DELIVERING MECHANISM.
APPLICATION FILED AUG. 23, 1902.
4 SHEETS—SHEET 2.
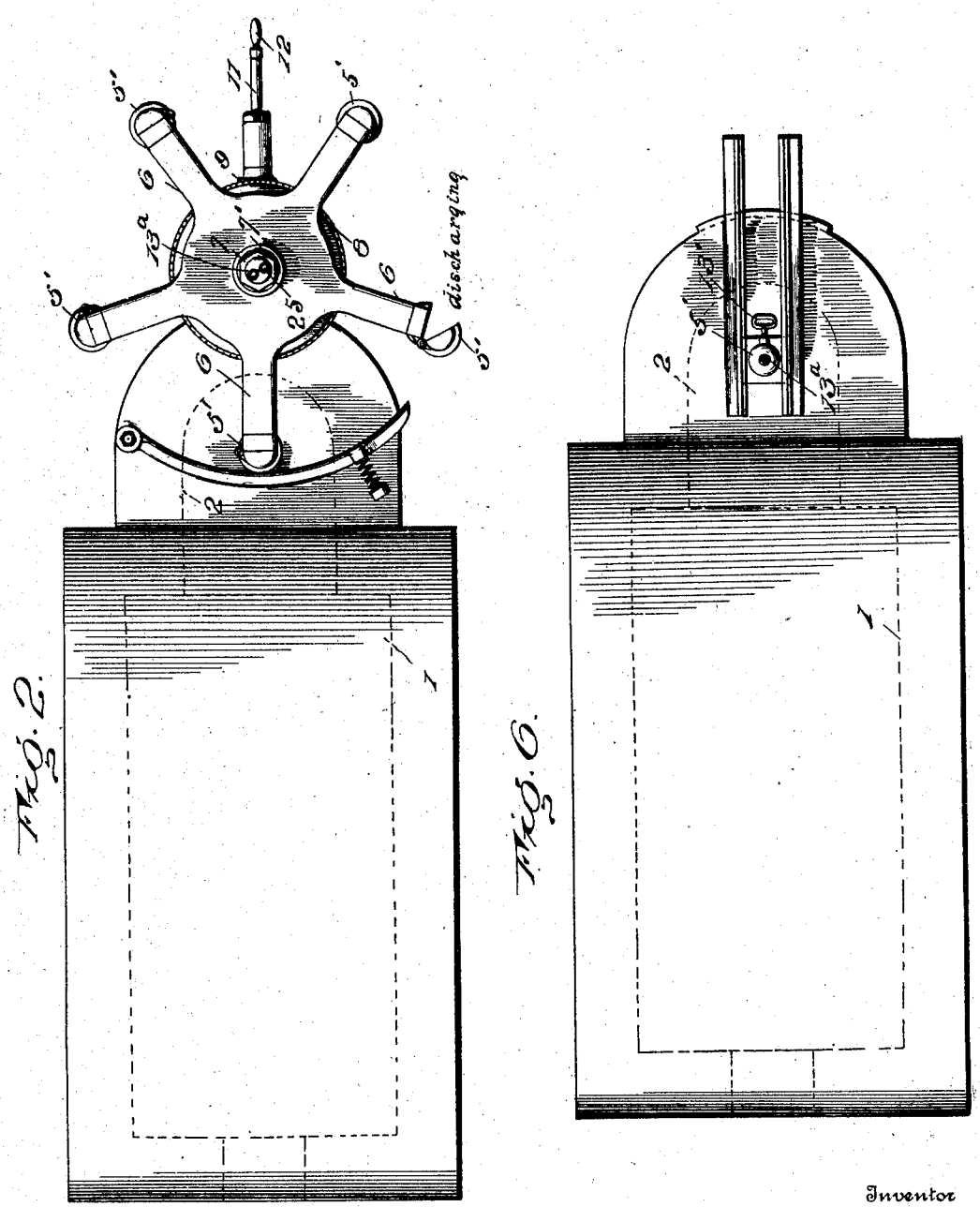
Witnesses
Inventor
C. E. Blue,
By A. S. Pattison
Attorney No. 832,118. PATENTED OCT. 2, 1906.
C. E. BLUE.
GLASS GATHERING AND DELIVERING MECHANISM.
APPLICATION FILED AUG. 23, 1902.

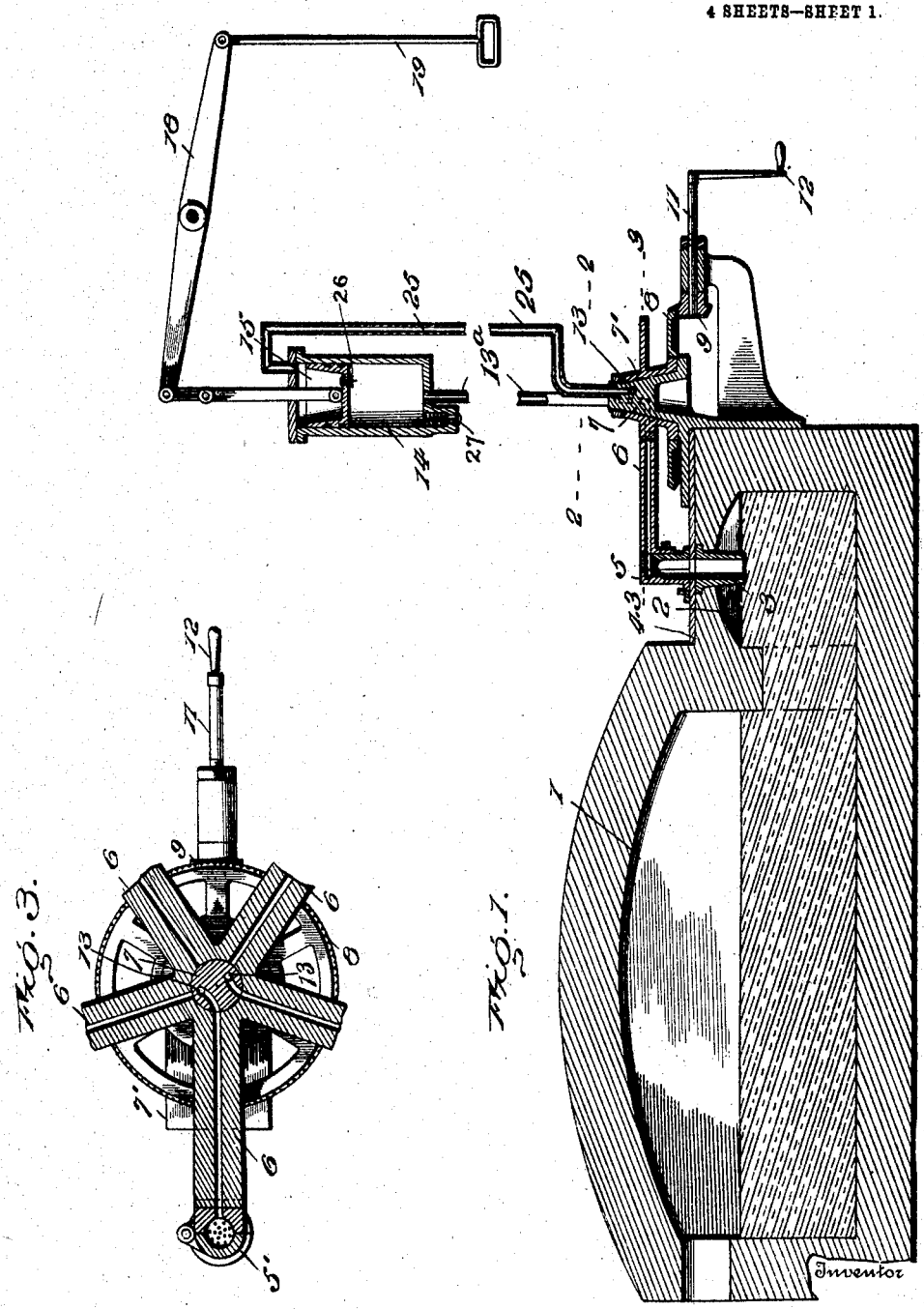

4 SHEETS—SHEET 3.

Witnesses
Inventor
C. E. Blue,
By A. S. Pattison
Attorney

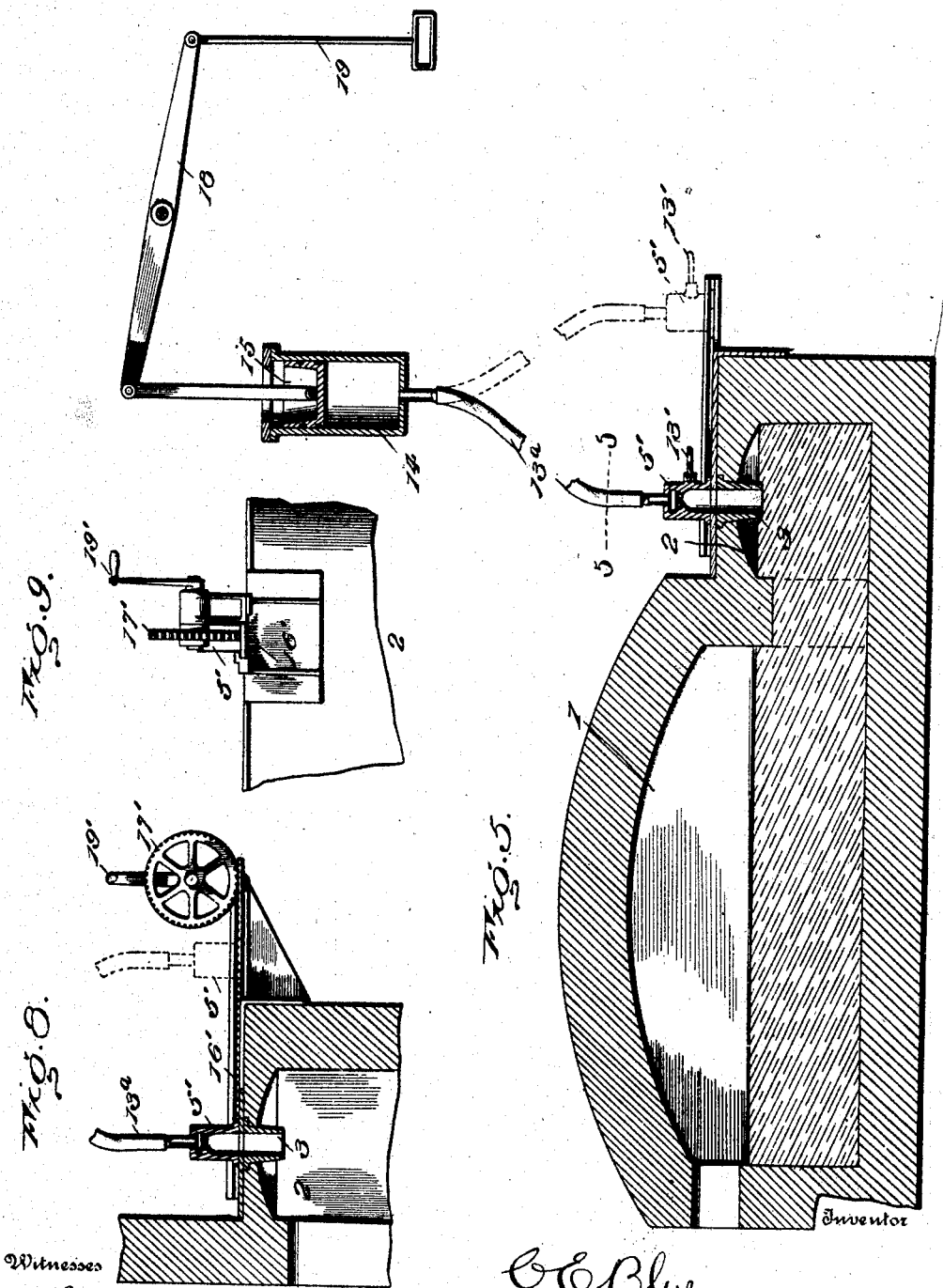

UNITED STATES PATENT OFFICE.

CHARLES E. BLUE, OF WHEELING, WEST VIRGINIA.

GLASS GATHERING AND DELIVERING MECHANISM.

No. 832,118.　　　Specification of Letters Patent.　　　Patented Oct. 2, 1906.

Application filed August 23, 1902. Serial No. 120,827.

*To all whom it may concern:*

Be it known that I, CHARLES E. BLUE, a citizen of the United States, residing at Wheeling, in the county of Ohio and State of West Virginia, have invented new and useful Improvements in Glass Gathering and Delivering Mechanism, of which the following is a specification.

My invention relates to improvements in glass gathering and delivering mechanism by means of which a predetermined quantity of molten glass is gathered from a furnace and delivered to any desired predetermined point, such as a mold, or it may be gathered and formed into an article directly in the gathering mold or receptacle, if desired.

My present invention involves an improved mechanism whereby a predetermined quantity of molten glass is drawn into a suitable receptacle or mold and then severed from the mass of glass and delivered therefrom to any desired point either as a finished article or in a plastic state to a finishing mold or molds.

Figure 7:
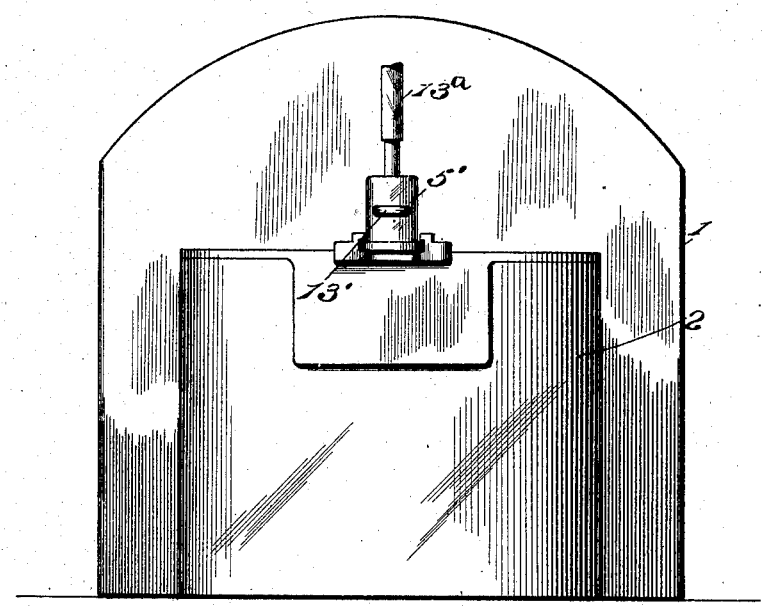
Figure 4:
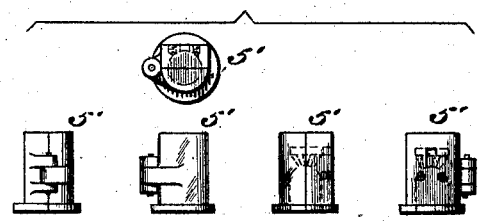

In the accompanying drawings, Figure 1 is a vertical central sectional view of a mechanism embodying my invention, it being shown in connection with a glass-furnace. Fig. 2 is a horizontal section of Fig. 1, taken on line 2 2, the molds or charging-receptacles being shown divided. Fig. 3 is a horizontal sectional view on the line 3 3 of Fig. 1. Fig. 4 shows side and top views of one of the open-and-shut molds shown in connection with Fig. 2. Fig. 5 is a vertical central sectional view of a modified form of my improved mechanism. Fig. 6 is a horizontal sectional view of Fig. 5, taken on the line 5 5 of Fig. 5. Fig. 7 is a front end elevation of Figs. 5 and 6. Fig. 8 is a central vertical sectional view of another modification of my improved mechanism. Fig. 9 is a front end elevation of Fig. 8.

Referring now particularly to Figs. 1, 2, 3, and 4, 1 indicates a glass-tank in which the glass is melted, and 2 is a chamber in communication therewith and from which the melted glass is taken. The top of the chamber 2 is provided with an outlet-opening, and this opening has a depending clay ring 3, which has its lower end extending into the melted glass, as shown. An iron plate 4 is placed on top of the chamber 2 and has an opening registering with the said clay ring 3. Supported by a suitable bracket is a hub 7, and surrounding and supported by this hub is a collar 7'. This collar is provided with any desired number of hollow radiating arms 6, and a suitable mold or charging-receptacle 5 is carried by the outer end of the arm or arms, as the case may be. As here shown, there are five arms 6, though it will be understood, should it be desired, only a single arm may be used. The hub 7 is provided with two L-shaped passages 13, the lower ends of these passages being adapted to register with the hollow arms 6 as the collar carrying the arms is revolved upon the said hub 7. The opposite and upper ends of these passages are respectively made to communicate, respectively, with opposite ends of a cylinder 14, which is located above the hub or in any desired relation thereto through the medium of the tubes or pipes 13$^a$ and 25. The collar 7' carries a gear-wheel 8, and this gear-wheel meshes with a suitable pinion or gear 9, which is connected to the inner end of a shaft 11, the opposite end of the shaft being provided with a suitable operating-handle 12. Through the medium of these gears and handle the hub, and thereby the arms 6, are made to revolve in a horizontal plane. An intermediately-pivoted lever 18 has one end connected to a piston 15, located within the cylinder 14, and a suitable handle 19 is connected with the opposite end of the said lever 18. In Fig. 1 I show solid or non-opening molds 5, carried by the arms 6. In Fig. 2 I show open-and-shut molds 5', the specific construction of which is more fully shown in Figs. 3 and 4. By reference to Fig. 1 it will be noticed that the molds carried by the arms 6 are adapted to be carried over and made to register with the upper end of the clay ring 3.

The operation of this invention as just described is as follows: When the parts are in the position shown in Fig. 1, the handle 19 is drawn downward, which moves the piston 15 upward within the cylinder 14, thereby causing a vacuum in the mold or charging-receptacle 5, which is in communication with the upper end of the clay ring 3. This vacuum sucks the mold full of molten glass from the chamber 2. The handle 12 is then given a quick turn, which revolves the arms and moves the filled mold or receptacle 5 quickly across the opening in the iron plate 4, the plate and the lower end of the mold serving to shear or cut the glass, thus leaving the mold filled. When the mold reaches the point marked "Discharging" in Fig. 2, the measured quantity is caused to drop from the charging mold or receptacle into a finishing mold or receptacle if the glass is to be further finished. Should, however, it be desired to form an article directly in the charging-mold, the glass will be permitted to remain therein sufficiently to become cooled. When a solid or non-opening mold is used, like that shown in Fig. 1, the glass is preferably removed therefrom by air-pressure, and this is done through the medium of the upstroke of the piston 15 in the cylinder 14, the air passing through the tube 25 and one of the passage-ways 13 to the mold that is at the discharging-point. In this way when a vacuum is formed for charging the charging or forming mold 5 pressure is at the same time caused in the discharging-mold for discharging the measured glass or formed article, as the case may be.

A mechanism operating as above described has a great advantage over a mechanism designed to fill the mold or charging-receptacle and then lift the same to be severed. I find that it is quite difficult, if not practically out of the question, to hold the molten glass in the mold by suction when it is being lifted from a batch or mass of molten glass, owing to the "pulling" effect of the glass, the peculiar nature of which is well known to those skilled in the art. All pulling effect, however, is entirely avoided in my mechanism, in that the mold after being charged moves only horizontally for severing the measured glass from the molten mass and which presents a practical method of measuring and severing and delivering a quantity of molten glass. This method of operation may be carried out by many variations of form and construction from that hereinbefore referred, and I do not limit myself to any specific form or construction of parts so long as it embodies the principle of operation hereinbefore explained. For instance, other of many forms that may be used to carry out this principle of operation are shown in Figs. 5, 6, 7, and 8, and 9.

In Figs. 5, 6, and 7 a reciprocating measuring or charging mold 5' is shown, and this is provided with a handle 13', by means of which it is moved to the charging and discharging positions, and the cutting or severing of the measured quantity is effected by the sliding or reciprocating movement of the charging-mold.

In Figs. 8 and 9 the measuring or charging mold is moved through the medium of the rack 16', gear 17', engaging therewith, and a handle 19', connected with the gear for rotating it.

The principal object of the construction herein explained and illustrated is to sever the glass in the charging-mold from the molten mass without moving the mold vertically sufficiently to cause the pulling effect hereinbefore referred to, and, as before stated, this may be accomplished in many ways differing in many respects from those herein set forth and illustrated without departing from the spirit and scope of my invention. It is considered that the plane of the measuring vessel is not substantially changed after it moves a distance equal to the diameter thereof from the plane it occupied before being moved.

Having thus described my invention, what I claim, and desire to secure by Letters Patent, is—

1. A mechanism of the character described, including a vessel for molten glass, a measuring vessel adapted to have its filling-opening placed in communication with the molten glass, means for causing a vacuum in the said measuring vessel, and means for severing the measured glass from the mass while the measuring vessel occupies the charging plane.

2. A mechanism of the character described including a vessel for molten glass, a measuring vessel adapted to have its filling-opening placed in communication with the molten glass, means for feeding the molten glass into the measuring vessel, and means for severing the measured glass from the mass while the measuring vessel occupies the charging plane.

3. A mechanism of the character described, including a vessel for molten glass, a tube depending into said molten glass, a measuring vessel adapted to have its filling-opening placed in communication with said tube, and a suction device in communication with said measuring vessel.

4. A mechanism of the character described, including a vessel for molten glass, a tube placed in communication with said molten glass, a measuring vessel, a suction device communicating with said measuring vessel, and means located between the tube and measuring vessel for severing the measured glass from the mass.

5. A machine of the character described, including a vessel for molten glass, a tube in communication with said molten glass, a laterally-movable measuring vessel adapted to register with said tube, and a suction device for charging said measuring vessel.

6. A mechanism of the character described, including a vessel containing molten glass, a tube having one end in communication with said molten glass, a movable measuring vessel having its filling-opening adapted to be placed adjacent the opposite end of said tube, a suction device in communication with said measuring vessel for charging it, and means for moving the measuring vessel laterally and thereby severing the measured glass from the mass.

7. A mechanism of the character described, including a vessel containing molten glass, a plurality of measuring vessels adapted to have their filling-openings successively placed in communication with said molten glass, a suction device communicating with said measuring vessel and adapted to charge it, means for moving the measuring vessels laterally, and a member coacting with said measuring vessels at the charging-point and serving to sever the measured glass from the mass by the lateral movement of the measuring vessel.

8. A mechanism of the character described, including a vessel containing a mass of molten glass, a rotatable member carrying a plurality of measuring vessels adapted to have their filling-openings respectively placed in communication with said mass of glass, a suction device in communication with said measuring vessel when at the charging-point, means for actuating the rotatable member, and means for severing the measured glass from the mass by the movement of the rotatable member while the measuring vessels are in the charging plane.

9. A mechanism for measuring glass, including a vessel for holding molten glass, a laterally-movable measuring vessel adapted to be placed in communication with said vessel holding molten glass, means for charging said measuring vessel with glass, and means for moving said measuring vessel laterally and thereby severing the measured glass from the mass while the measuring vessel is in substantially the filling plane.

10. A mechanism of the character described, including a vessel containing a mass of molten glass, a measuring vessel having a horizontal charging plane and adapted to be placed in filling communication with said mass of glass, a suction device in communication with the measuring vessel when in filling communication with the mass of glass, and means for severing the measured glass from the mass while in the horizontal charging plane.

11. A mechanism of the character described, including a vessel containing a mass of molten glass, and a measuring vessel movable to filling and discharging points in a single plane, a suction device in communication with the measuring vessel when at the filling-point, and means for severing the measured glass from the mass while in the filling plane.

12. A mechanism of the character described including a vessel for molten glass, a measuring vessel having a filling-opening, the vessel for molten glass having an exit passage-way establishing a closed communication between the mass of glass and the filling-opening of the measuring vessel, a suction device for charging the measuring vessel, and means for severing the measured glass from said mass.

13. A mechanism of the character described, including a vessel for molten glass, a measuring vessel having a filling-opening, the vessel for the molten glass having a wall with an exit passage-way in communication with the filling-opening of the measuring vessel, a suction device in communication with the measuring vessel, and means for severing the measured glass from said mass.

14. A mechanism of the character described, including a vessel for molten glass, a measuring vessel having a filling-opening, the molten-glass vessel having an exit-opening establishing filling communication with the measuring vessel, means for forcibly charging said measuring vessel, and means for severing the measured glass from the mass while the filling-opening is in communication with the exit-opening of the molten-glass vessel.

In testimony whereof I have hereunto set my hand in the presence of two subscribing witnesses.

CHARLES E. BLUE.

Witnesses:
L. C. GOOD,
A. J. WOIT.